United States Patent
Alahyari

(10) Patent No.: US 12,330,801 B2
(45) Date of Patent: Jun. 17, 2025

(54) COOLING ARCHITECTURE FOR LIQUID HYDROGEN SUPERCONDUCTING SYSTEM

(71) Applicant: Raytheon Technologies Corporation, Farmington, CT (US)

(72) Inventor: Abbas A. Alahyari, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 217 days.

(21) Appl. No.: 18/325,279

(22) Filed: May 30, 2023

(65) Prior Publication Data
US 2024/0400220 A1    Dec. 5, 2024

(51) Int. Cl.
| | | |
|---|---|---|
| B64D 37/34 | (2006.01) | |
| B64D 33/08 | (2006.01) | |
| B64D 37/30 | (2006.01) | |
| F02C 7/224 | (2006.01) | |

(52) U.S. Cl.
CPC ............. *B64D 33/08* (2013.01); *B64D 37/30* (2013.01); *B64D 37/34* (2013.01); *F02C 7/224* (2013.01); *F05D 2260/601* (2013.01)

(58) Field of Classification Search
CPC .... B64D 37/34; F02C 7/224; F05D 2260/601
See application file for complete search history.

(56) References Cited

U.S. PATENT DOCUMENTS

| | | |
|---|---|---|
| 6,164,078 A | 12/2000 | Lak et al. |
| 10,288,325 B2 | 5/2019 | Vaisman |
| 11,148,814 B2 | 10/2021 | Elsherbini et al. |
| 2020/0047908 A1* | 2/2020 | Filipenko ............... B64D 31/18 |
| 2021/0348561 A1 | 11/2021 | Cocks et al. |
| 2023/0243305 A1* | 8/2023 | Minelli ..................... F02C 7/16 |
| | | 60/730 |

FOREIGN PATENT DOCUMENTS

| | | |
|---|---|---|
| DE | 102017223803 A1 | 6/2019 |
| FR | 3123890 A1 | 12/2022 |
| GB | 2548123 A | 9/2017 |

OTHER PUBLICATIONS

Extended European Search Report for European Application No. 24179110.2 mailed Oct. 16, 2024.

\* cited by examiner

*Primary Examiner* — Scott J Walthour
(74) *Attorney, Agent, or Firm* — Carlson, Gaskey & Olds, P.C.

(57) ABSTRACT

An aircraft propulsion system a cryogenic fuel system, a superconducting electrical device that is operable at a cryogenic temperature, a cooling system where a cooling fuel flow is utilized for maintaining the superconducting electrical device at the cryogenic temperature, an ejector where the primary fuel flow from the fuel system drives the cooling fuel flow through the cooling system to form a combined fuel flow, and a separator where a first portion of the combined fuel flow from the ejector is routed to the core engine and a second portion of the combined fuel flow is routed back to the cooling system.

20 Claims, 3 Drawing Sheets

COOLING ARCHITECTURE FOR LIQUID HYDROGEN SUPERCONDUCTING SYSTEM

TECHNICAL FIELD

The present disclosure relates generally to an aircraft propulsion system that includes a superconducting device and more specifically to a thermal management system for maintaining cryogenic operating temperatures for superconducting devices.

BACKGROUND

Reduction and/or elimination of carbon emissions generated by aircraft operation is a stated goal of aircraft manufacturers and airline operators. Cryogenically cooled superconducting materials may enable high-efficiency and high-power density aviation class electric motors and drives. Alternate aircraft fuels such as liquid hydrogen are maintained at cryogenic temperatures but are quickly heated due to exposure to thermal loads and increases in pressures may raise temperatures above those needed to provide sufficient cooling of superconducting materials and devices.

SUMMARY

An aircraft propulsion system according to an exemplary embodiment of this disclosure includes, among other possible things, a core engine that generates an exhaust gas flow, a cryogenic fuel system that includes a fuel pump that communicates a primary fuel flow to the core engine, a superconducting electrical device that is operable at a predefined cryogenic temperature, a cooling system where a cooling fuel flow is utilized for maintaining the superconducting electrical device at the predefined cryogenic temperature, an ejector where the primary fuel flow from the fuel system drives the cooling fuel flow through the cooling system to form a combined fuel flow, and a separator where a first portion of the combined fuel flow from the ejector is routed to the core engine and a second portion of the combined fuel flow is routed back to the cooling system.

In a further embodiment of the foregoing, the aircraft propulsion system includes a preliminary heat exchanger where the second portion of the combined fuel flow is cooled by a portion of the primary fuel flow upstream of the ejector.

In a further embodiment of any of the foregoing, the aircraft propulsion system includes at least one heat load that is in thermal communication with the primary fuel flow. The primary fuel flow is heated by the at least one heat load upstream of the ejector.

In a further embodiment of any of the foregoing, the aircraft propulsion system includes a superconducting device heat exchanger where thermal energy from the superconducting electrical device is transferred into the cooling fuel flow of the cooling system.

In a further embodiment of any of the foregoing, the aircraft propulsion system includes an expansion device that is disposed between the preliminary heat exchanger and the superconducting electrical device where the cooling fuel flow is cooled through expansion to generate a supercooling flow.

In a further embodiment of any of the foregoing, the aircraft propulsion system includes, the cooling system includes a coolant loop with a secondary coolant. The secondary coolant is cooled by the cooling fuel flow in a coolant loop heat exchanger.

In a further embodiment of any of the foregoing aircraft propulsion systems, the secondary coolant is of a compound different than the cooling fuel flow.

In a further embodiment of any of the foregoing aircraft propulsion systems, the fuel system includes a cryogenic fuel tank that is maintained at temperatures sufficient to maintain a cryogenic fuel in a liquid state.

In a further embodiment of any of the foregoing aircraft propulsion systems, the superconducting device includes one of an electric motor or a generator.

In a further embodiment of any of the foregoing aircraft propulsion systems, the electric motor is coupled to a portion of the core engine to provide a portion of power to drive a propulsor.

In a further embodiment of any of the foregoing aircraft propulsion systems, the separator includes a controllable valve assembly.

A superconducting thermal management system for an aircraft propulsion system according to another exemplary embodiment of this disclosure includes, among other possible things, a heat exchanger where thermal energy from a superconducting electrical device is transferred into a cooling fuel flow, an ejector where a primary fuel flow drives the cooling fuel flow, a separator where a combined fuel flow includes the primary fuel flow and the cooling fuel flow are separated into a first portion routed to a core engine and a second portion routed to the heat exchanger for cooling the superconducting electrical device.

In a further embodiment of the foregoing, the superconducting thermal management system includes a preliminary heat exchanger where the second portion of the combined fuel flow is cooled by a portion of the primary fuel flow to generate the cooling fuel flow.

In a further embodiment of any of the foregoing, the superconducting thermal management system includes an expansion device for further cooling the cooling fuel flow.

In a further embodiment of any of the foregoing, the superconducting thermal management system includes secondary coolant loop with a secondary coolant. The secondary coolant transfers thermal energy that is generated by the superconducting device into the cooling fuel flow in a coolant loop heat exchanger.

In a further embodiment of any of the foregoing superconducting thermal management systems, the primary fuel flow and the cooling fuel flow include liquid hydrogen.

A method of managing thermal conditions of a superconducting device of an aircraft propulsion system according to another exemplary embodiment of this disclosure includes, among other possible things, driving a cooling fuel flow with a primary fuel flow through an ejector to output a combined fuel flow, separating the combined fuel flow that includes the primary fuel flow and the cooling fuel flow in a separator into a first portion that is routed to a core engine and a second portion for cooling the superconducting electrical device, cooling the second portion of the combined fuel flow to generate the cooling fuel flow in a preliminary heat exchanger with a portion of the primary fuel flow upstream of the ejector, and transferring thermal energy from a superconducting electrical device into the cooling flow to maintain the superconducting electrical device within predefined temperature range.

In a further embodiment of the foregoing, the method further includes further cooling the cooling fuel flow from the preliminary heat exchanger by expansion through an expansion valve.

In a further embodiment of the foregoing, the method further includes generating a motive energy within the primary flow by accepting thermal energy from at least one heat load prior to flowing into the ejector.

In a further embodiment of the foregoing, the method further includes transferring thermal energy from the superconducting device into a coolant within a coolant loop and transferring thermal energy from the coolant into the cooling fuel flow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
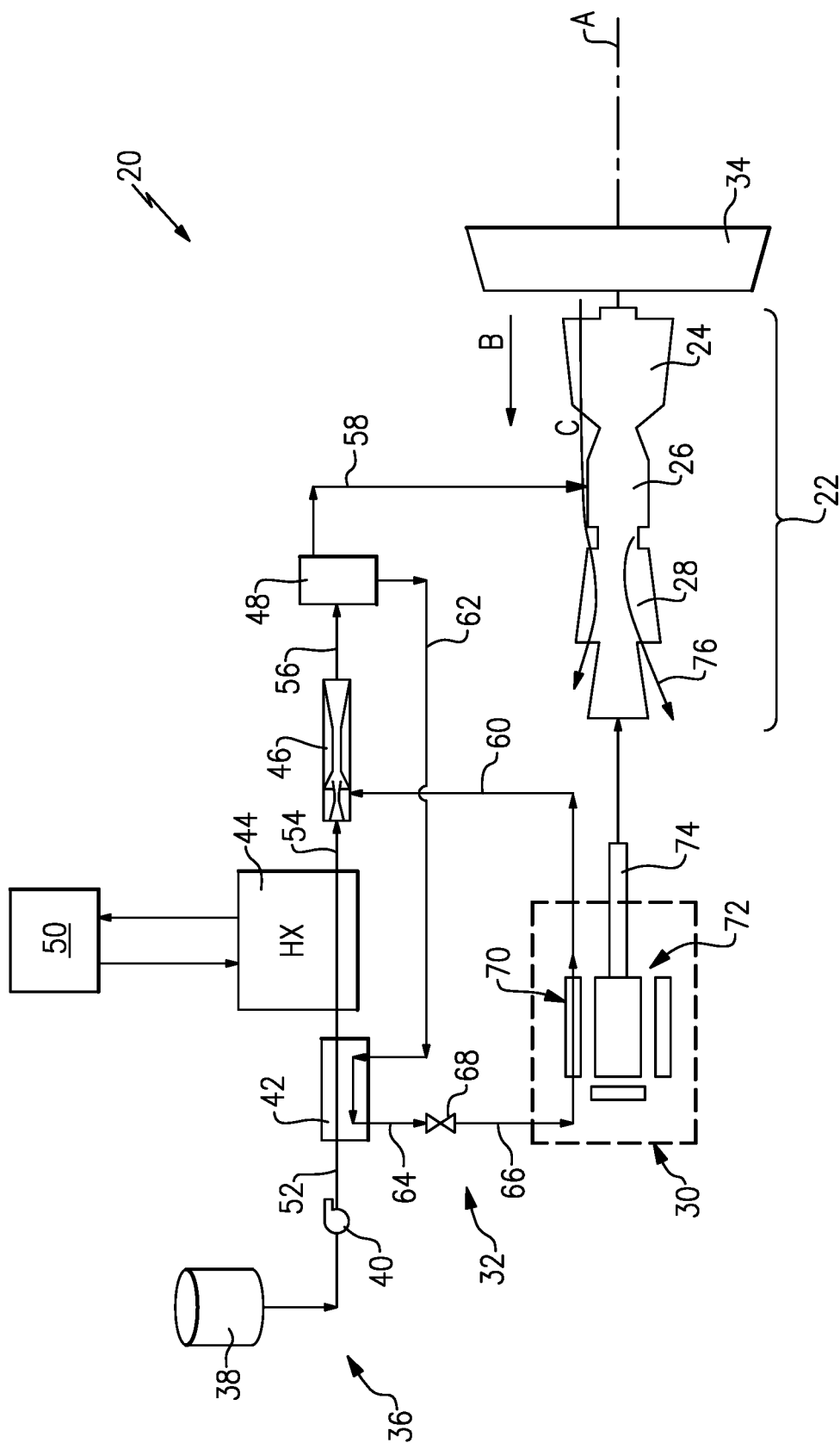
FIG. 1 is a schematic view of an example aircraft propulsion system embodiment.

FIG. 1 schematically illustrates an example propulsion system 20 that includes a superconducting electrical device 30 that operate at extreme low temperatures of around 20° Kelvin (−423° F.). A superconducting thermal management system 32 utilizes an ejector 46 to supercool a cooling fuel flow and maintain cryogenic temperatures of the superconducting electrical device.

The example propulsion system 20 includes a fan section 34 driven by a core engine 22. The core engine 22 includes a compressor section 24, a combustor section 26 and the turbine section 28 disposed along an engine longitudinal axis A. The fan section 34 drives inlet airflow along a bypass flow path B, while the compressor section 24 draws inlet air along a core flow path C. The inlet airflow is compressed and communicated to the combustor section 26 where the compressed core airflow is mixed with a fuel flow 58 from a fuel system 36 and ignited to generate an exhaust gas flow 76. The exhaust gas 76 flow expands through the turbine section 28 where energy is extracted and utilized to drive the fan section 34 and the compressor section 24.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

The example fuel system 36 is configured to provide a hydrogen based fuel such as a liquid hydrogen ($LH_2$) to the combustor 26. Although hydrogen is disclosed by way of example, other non-carbon-based fuels, biofuels and/or other sustainable aviation fuels could be utilized and are within the contemplation of this disclosure. Moreover, the disclosed features may also be beneficial in an engine configured to operate with traditional carbon-based fuels.

A superconducting electrical assembly 30 provides high power densities and operates at cryogenic temperatures of around 20° Kelvin (−423° F.). The terms "around" and "about" as applied to a temperature range in this disclosure includes a temperature range of +/−7 degrees. The superconducting thermal management system 32 utilizes a supercooled cooling fuel flow 66 to cool and maintain desired temperatures of the superconducting electrical assembly 30. The example superconducting electric assembly includes a motor 72 that drives an output shaft 74. The output shaft 74 may be coupled to the core engine 22 to provide additional power. The example motor 72 may directly provide power to drive the propulsive fan 34 or drive component or accessory items that support operation of the core engine 22. Moreover, although the example superconducting electrical device is shown and described as an electric motor, other electrical devices and electronics that are designed to operate at cryogenic temperatures are also contemplated and may be benefit from this disclosure.

Liquid hydrogen fuel boils at around 20° Kelvin (−423° F.) at pressures around atmospheric pressure. Increases in pressures and thermal loads may heat the fuel to temperatures above temperatures desired for cooling the superconducting electrical assembly 30. The example thermal management system 32 super cools a portion of the fuel flow to maintain temperatures within a range needed for the cooling the superconducting electrical assembly 30.

In one disclosed example embodiment, a pump 40 generates a primary fuel flow 52 from a fuel storage tank 38. A preliminary heat exchanger 42 provides for cooling a secondary cooling flow 62. The secondary cooling flow 62 is a portion of the primary fuel flow that is further cooled for use in cooling the superconducting electrical assembly 30. The primary fuel flow 52 is used for cooling other thermal loads 50 within a heat exchanger 44 and thereby accepts thermal energy and becomes a heated primary fuel flow 54. The other thermal loads 50 may be from systems supporting operation of an aircraft and/or the core engine 22. For example, engine lubrication systems, cooling air systems and environmental control systems may contribute to the thermal loads 50 that utilized the cryogenic fuel as a heat sink.

The heated primary fuel flow 54 is a high energy motive fuel stream that is communicated through an ejector 46 to a separator 48. The ejector 46 is used to generate the cooling flow through the thermal management system 32. In the ejector 46, the heated primary fuel flow 54 and a heated cooling flow 60 are mixed to generate a combined flow 56 that is exhausted from the ejector 46.

A separator 48 receives the combined flow 56 that includes heated portions of the primary fuel flow 54 and the secondary cooling flow 60. A first portion 58 of the combined fuel flow 56 is communicated to the combustor 26 and a second portion 62 is communicated to the thermal management system 32. The relative amount of each of the first portion 58 and the second portion 62 are controlled by the demand for fuel by the combustor 26. In one example embodiment, most of the combined flow 56 is provided as the first portion of fuel flow 58 to the combustor 26.

The example separator 48 may be a controllable valve assembly such as, for example, a 3-way valve, a T-conduit including fixed orifices or a proportional valve that is controllable to govern and proportion flow to the combustor 26 and to the thermal management system 32. Moreover, the separator 48 may be any fluid control device that is compatible with the operational pressures and temperatures of the combined flow 56.

The second portion 62 of the combined fuel flow 56 is cooled in the preliminary heat exchanger 42 by the primary fuel flow 52. The primary fuel flow 52 is placed in thermal communication with the second portion 62 of the combined fuel flow 56 prior to accepting thermal energy from any other heat loads 50. A cooled fuel flow 64 is exhausted from the preliminary heat exchanger 42 and expanded through an expansion device 68 to generate a supercooled fuel flow 66. The supercooled fuel flow 66 is communicated to the superconducting electrical assembly 30 to cool the superconducting device 72.

In one example embodiment, the superconducting device is the electric motor 72 that drives the shaft 74. The supercooled fuel flow 66 is communicated through a heat exchange device 70 that is associated with the electric motor 72. The heat exchange device 70 may be a heat exchanger or an integral part of the motor 72. The supercooled fuel flow 66 accepts thermal energy from the electric motor 72 to become the heated cooling fuel flow 60 that is drawn into the ejector 46 by the motive flow of the primary fuel flow 54. Accordingly, the cooling flows within the thermal management system 32 are supercooled to maintain the superconducting electric motor 72 at a predefined cryogenic temperature.

Figure 2:
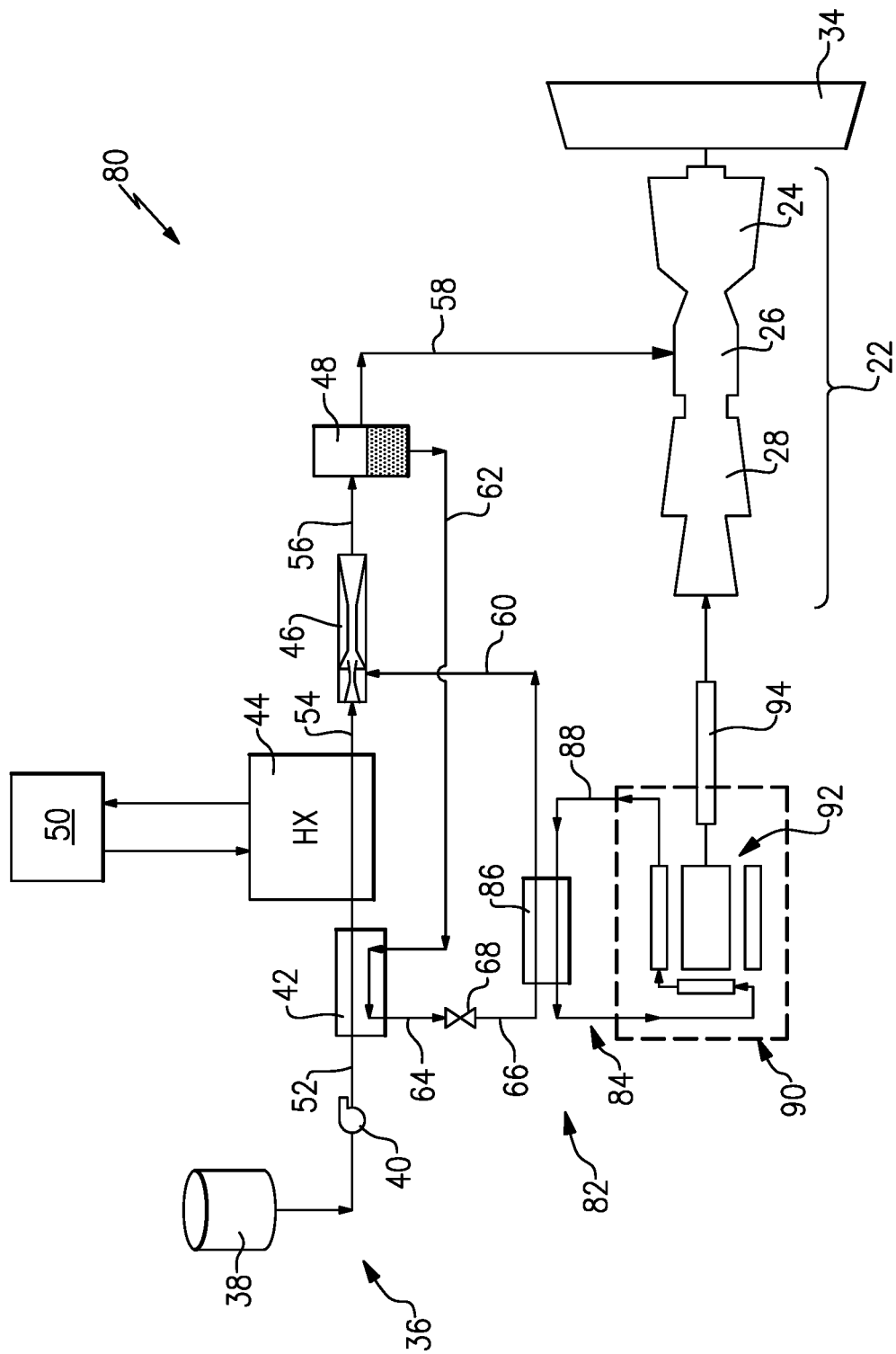
FIG. 2 is a schematic view of another aircraft propulsion system embodiment.

Referring to FIG. 2, another propulsion system 80 is shown with another example thermal management system 82. The example thermal management system 82 includes a coolant loop 84 with a secondary coolant 88. In one example embodiment, the secondary coolant 88 is Helium in a liquid state. A coolant loop heat exchanger 86 places the secondary coolant 88 into thermal communication with the supercooled fuel flow 66. Thermal energy is passed into the supercooled fuel flow 66 to cool the superconducting electrical assembly 90. In this example embodiment, the superconducting electrical assembly 90 is an electric motor 92 that drives a shaft 94. The shaft 94 may be coupled to the core engine 22 to assist in driving the propulsive fan 34 and/or to drive accessory components and or systems.

Figure 3:
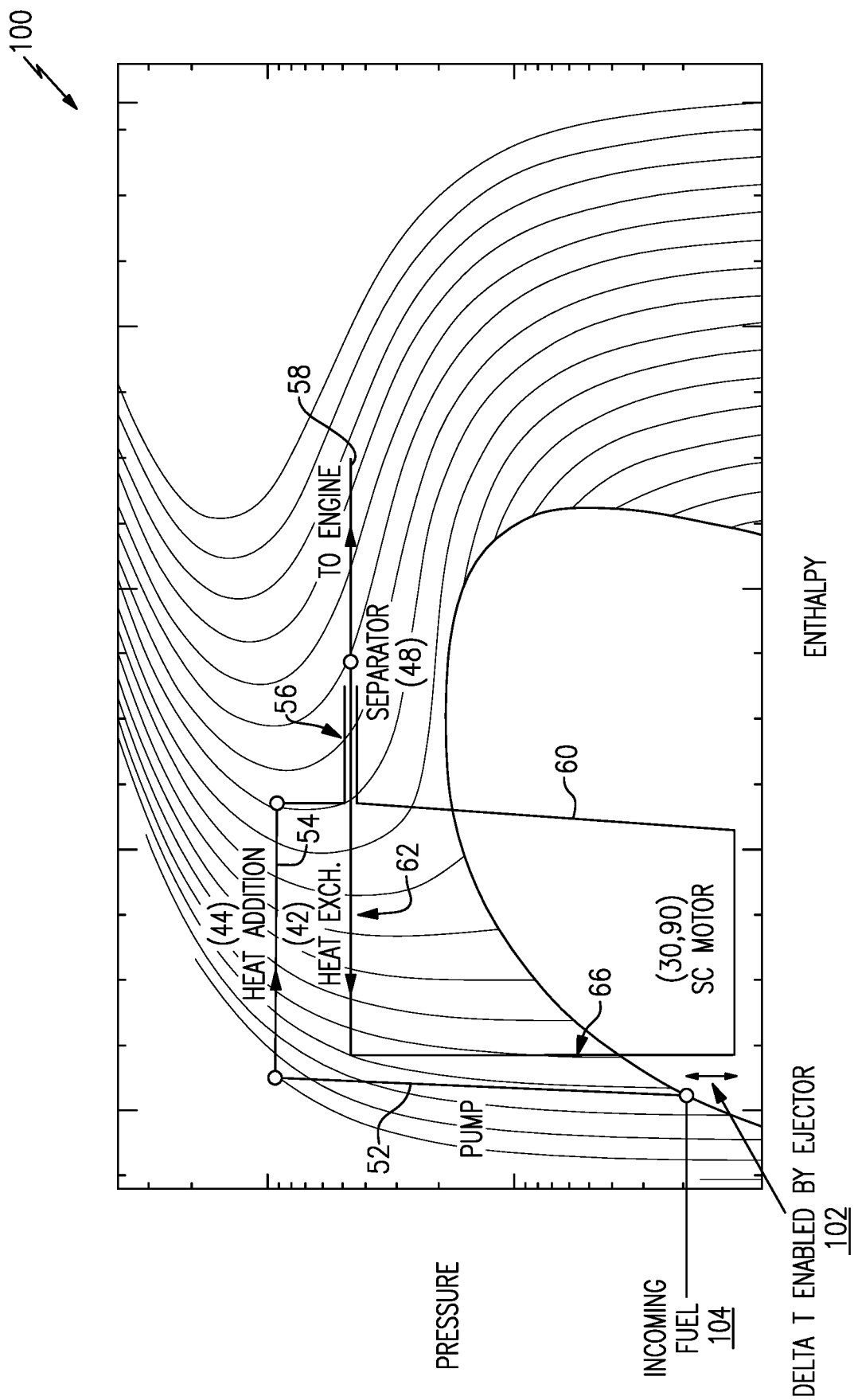
FIG. 3 is a pressure-enthalpy diagram of illustrating operation of an example propulsion system embodiment.

Referring to FIG. 3, with continued reference to FIGS. 1 and 2, a pressure-enthalpy diagram is shown and indicated at 100. The pressure-enthalpy diagram 100 schematically illustrates the operation of the cryogenic fuel system 36, the thermal management systems 32, 82 and how the ejector 46 enables a change in temperature illustrated at 102 below that of incoming fuel flow 104.

In operation, the initial incoming fuel flow 104 is pressurized in the pump 40 to a predefined pressure. The increase in pressure is at least partially determined based on pressures required for communication to the combustor 26 of the core engine 22. However, other operational requirements may also factor into the desired pressure of the fuel flow 52. In one example embodiment, the incoming fuel flow 104 is a liquid at a temperature of around 20° Kelvin (−423° F.) and a pressure of around 14 psi (1 bar). The pump 40 pressurizes the incoming fuel flow 104 to a pressure of around 1200 psi (82 bar). The pressurized fuel flow 52 is communicated to the preliminary heat exchanger 42 where an initial amount of thermal energy is accepted to precool the second portion 62 of the combined fuel flow 56 from the separator 48.

The primary fuel flow 52 accepts additional thermal energy from additional heat loads 50 in the heat exchanger 44. The primary fuel flow 52 becomes a two-phase heated primary fuel flow 54 that is at a temperature of about 40° Kelvin (−387° F.). The two-phase heated primary fuel flow 54 maintains a pressure of around 1200 psi into the and through the ejector 46. The two-phase heated primary fuel flow 54 provides the motive flow force to generate flows through the example thermal management systems 32, 82 shown in FIGS. 1 and 2.

The ejector 46 draws fuel flow from the thermal management system 32, 82 to create the combined fuel flow 56. In one example embodiment, the mixing of the primary fuel flow 54 with the cooling fuel flow 60 generates a two-phase combined hydrogen fuel flow 56 at a temperature of about 30° Kelvin (−405° F.) and a pressure of about 600 psi. The combined fuel flow 56 is divided in the separator 48 into the first portion 58 that is communicated to the combustor 26 and the second portion 62 that is communicated to the thermal management system 32, 82 for supercooling.

The second portion 62 of fuel flow from the separator 48 is initially cooled by the incoming primary fuel flow 104 in the preliminary heat exchanger 42. The now cooled cooling fuel flow 64 is further cooled by expansion through the expansion valve 68. The motive force to drawn the cooling fuel flow 64 through the expansion valve 68 is provided by the ejector 46 and results in the supercooled fuel flow 66 that is at a temperature lower than that of the incoming fuel flow 104. In one example embodiment, the supercooled cooling flow 66 is cooled to a temperature of around 15° Kelvin (−432° F.) with a reduced pressure of around 2 psi. The supercooled cooling flow 66 is then communicated to cool the superconducting motor 30, 90. Once the supercooled cooling flow 66 accepts thermal energy from the superconducting motor 30, 90 it becomes heated to a temperature of around 22° Kelvin (−423° F.) at a pressure of around 2 psi. The heated cooling flow 60 may be mostly vapor or a two-phase flow that is drawn into the ejector 46 with the motive flow force of the heated primary fuel flow 54. The flow and cooling of the fuel flows operate continuously during engine operation.

It should be appreciated that the described temperatures and pressures are disclosed by way of example and that deviations from the disclosed temperatures and pressures within a reasonable operational tolerances are contemplated and are within the scope of this disclosure. Moreover, the disclosed example contemplates the use of liquid hydrogen fuel and thereby the example temperatures and pressures are based on the characteristics of liquid hydrogen fuel. Other cryogenic fuels may operate at different pressures and temperatures and are within the contemplation and scope of this disclosure.

In the example embodiment shown in FIG. 2, the supercooled cooling flow 66 would accept thermal energy from the cooling loop 84 and would be indicated as part of the heat input from the electric motor 90 as shown at 102 in the diagram 100.

Accordingly, the example thermal management systems 32, 82 supercool a cryogenic fuel to maintain the superconducting electrical device at predefined cryogenic temperatures.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of managing thermal conditions of a superconducting electrical device of an aircraft propulsion system comprising:
   driving a cooling fuel flow with a primary fuel flow through an ejector to output a combined fuel flow;
   separating the combined fuel flow including the primary fuel flow and the cooling fuel flow in a separator into a first portion routed to a core engine and a second portion for cooling the superconducting electrical device;

cooling the second portion of the combined fuel flow to generate the cooling fuel flow in a preliminary heat exchanger with a portion of the primary fuel flow upstream of the ejector; and transferring thermal energy from the superconducting electrical device into the cooling flow to maintain the superconducting electrical device within a temperature range.

2. The method as recited in claim 1, further comprising further cooling the cooling fuel flow from the preliminary heat exchanger by expansion through an expansion valve.

3. The method as recited in claim 1, further comprising generating a motive energy within the primary flow by accepting thermal energy from at least one heat load prior to flowing into the ejector.

4. The method as recited in claim 1, further comprising transferring thermal energy from the superconducting electrical device into a coolant within a coolant loop and transferring thermal energy from the coolant into the cooling fuel flow.

5. An aircraft propulsion system comprising:
a core engine configured to generate an exhaust gas flow;
a cryogenic fuel system including a fuel pump configured to communicate a primary fuel flow to the core engine;
a superconducting electrical device operable at a cryogenic temperature;
a cooling system where a cooling fuel flow is utilized for maintaining the superconducting electrical device at the cryogenic temperature;
an ejector where the primary fuel flow from the fuel system drives the cooling fuel flow through the cooling system to form a combined fuel flow; and
a separator where a first portion of the combined fuel flow from the ejector is routed to the core engine and a second portion of the combined fuel flow is routed back to the cooling system.

6. The aircraft propulsion system as recited in claim 5, including a preliminary heat exchanger where the second portion of the combined fuel flow is cooled by a portion of the primary fuel flow upstream of the ejector.

7. The aircraft propulsion system as recited in claim 6, including at least one heat load in thermal communication with the primary fuel flow, wherein the primary fuel flow is heated by the at least one heat load upstream of the ejector.

8. The aircraft propulsion system as recited in claim 6, including a superconducting device heat exchanger where thermal energy from the superconducting electrical device is transferred into the cooling fuel flow of the cooling system.

9. The aircraft propulsion system as recited in claim 6, including an expansion device disposed between the preliminary heat exchanger and the superconducting electrical device where the cooling fuel flow is cooled through expansion to generate a supercooling flow.

10. The aircraft propulsion system as recited in claim 5, wherein the cooling system includes a coolant loop with a secondary coolant, and the secondary coolant is cooled by the cooling fuel flow in a coolant loop heat exchanger.

11. The aircraft propulsion system as recited in claim 10, wherein the secondary coolant is of a compound different than the cooling fuel flow.

12. The aircraft propulsion system as recited in claim 5, wherein the fuel system includes a cryogenic fuel tank that is maintained at temperatures sufficient to maintain a cryogenic fuel in a liquid state.

13. The aircraft propulsion system as recited in claim 5, wherein the superconducting electrical device comprises one of an electric motor or a generator.

14. The aircraft propulsion system as recited in claim 13, wherein the electric motor is coupled to a portion of the core engine to provide a portion of power to drive a propulsor.

15. The aircraft propulsion system as recited in claim 5, wherein the separator comprises a controllable valve assembly.

16. A superconducting thermal management system for an aircraft propulsion system comprising:
a superconducting electrical device;
a heat exchanger in thermal communication with the superconducting electrical device, the heat exchanger configured to transfer thermal energy from the superconducting electrical device into a cooling fuel flow;
an ejector configured to receive a primary fuel flow and the cooling fuel flow, the ejector configured to drive the cooling fuel flow using the primary fuel flow and form a combined fuel flow with the primary fuel flow and the cooling fuel flow;
a separator in fluid communication with the ejector and the heat exchanger and configured to separate the combined fuel flow into a first portion routed to a core engine and a second portion routed to the heat exchanger for cooling the superconducting electrical device.

17. The superconducting thermal management system as recited in claim 16, including a preliminary heat exchanger where the second portion of the combined fuel flow is cooled by a portion of the primary fuel flow to generate the cooling fuel flow.

18. The superconducting thermal management system as recited in claim 17, including an expansion device for further cooling the cooling fuel flow.

19. The superconducting thermal management system as recited in claim 17, including a secondary coolant loop with a secondary coolant, the secondary coolant transferring thermal energy generated by the superconducting device into the cooling fuel flow in a coolant loop heat exchanger.

20. The superconducting thermal management system as recited in claim 16, wherein the primary fuel flow and the cooling fuel flow comprise liquid hydrogen.

* * * * *